No. 654,586. Patented July 31, 1900.
F. M. ASHLEY.
CONDUIT ELECTRIC RAILWAY SYSTEM.
(Application filed Feb. 26, 1898.)
(No Model.) 3 Sheets—Sheet 1.
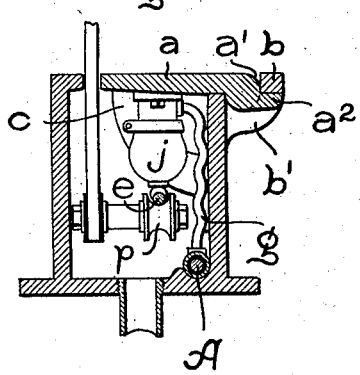
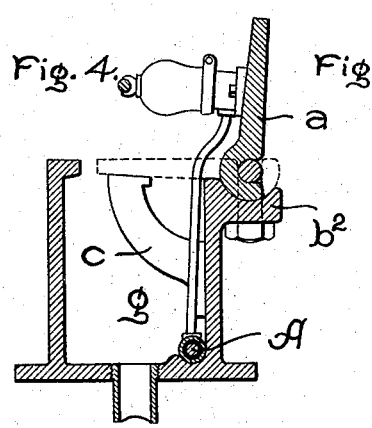
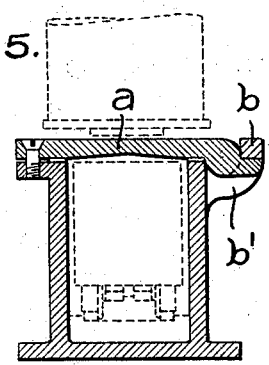
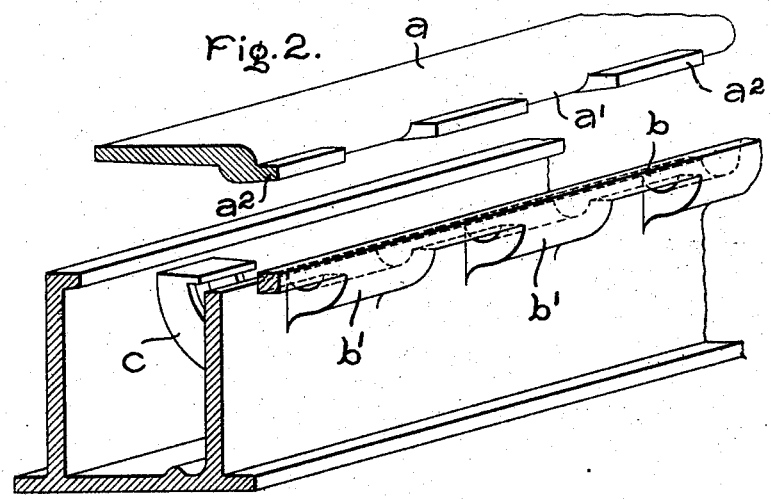
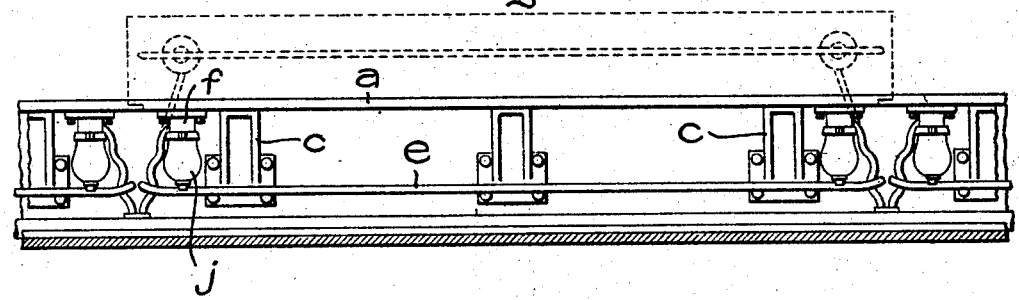

No. 654,586. Patented July 31, 1900.
F. M. ASHLEY.
CONDUIT ELECTRIC RAILWAY SYSTEM.
(Application filed Feb. 26, 1898.)
(No Model.) 3 Sheets—Sheet 2.
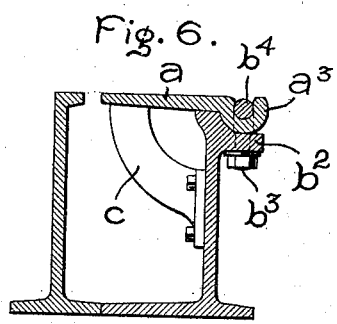
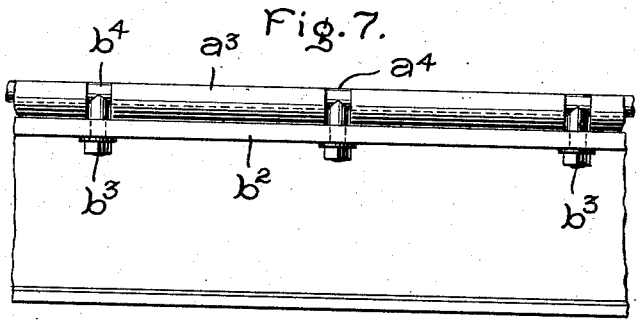
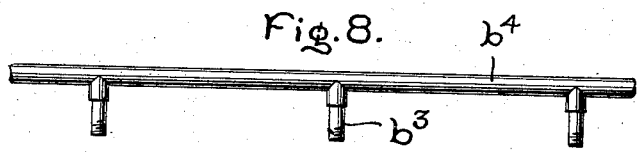
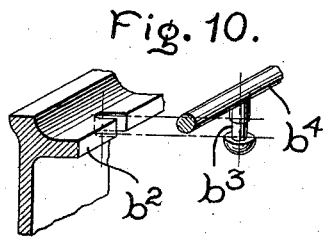
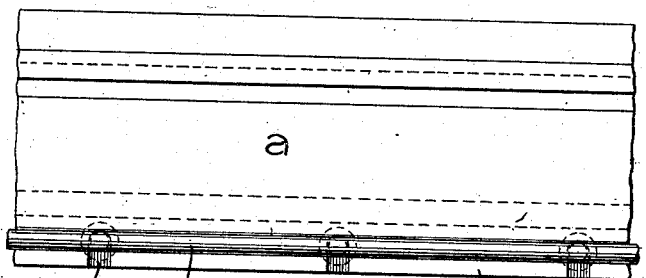
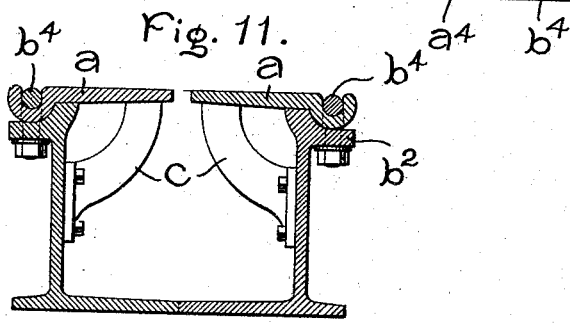
Witnesses
A. H. Abell.
O. F. MacDonald.
By his Attorney
Inventor
Frank M. Ashley
Albert G. Davis

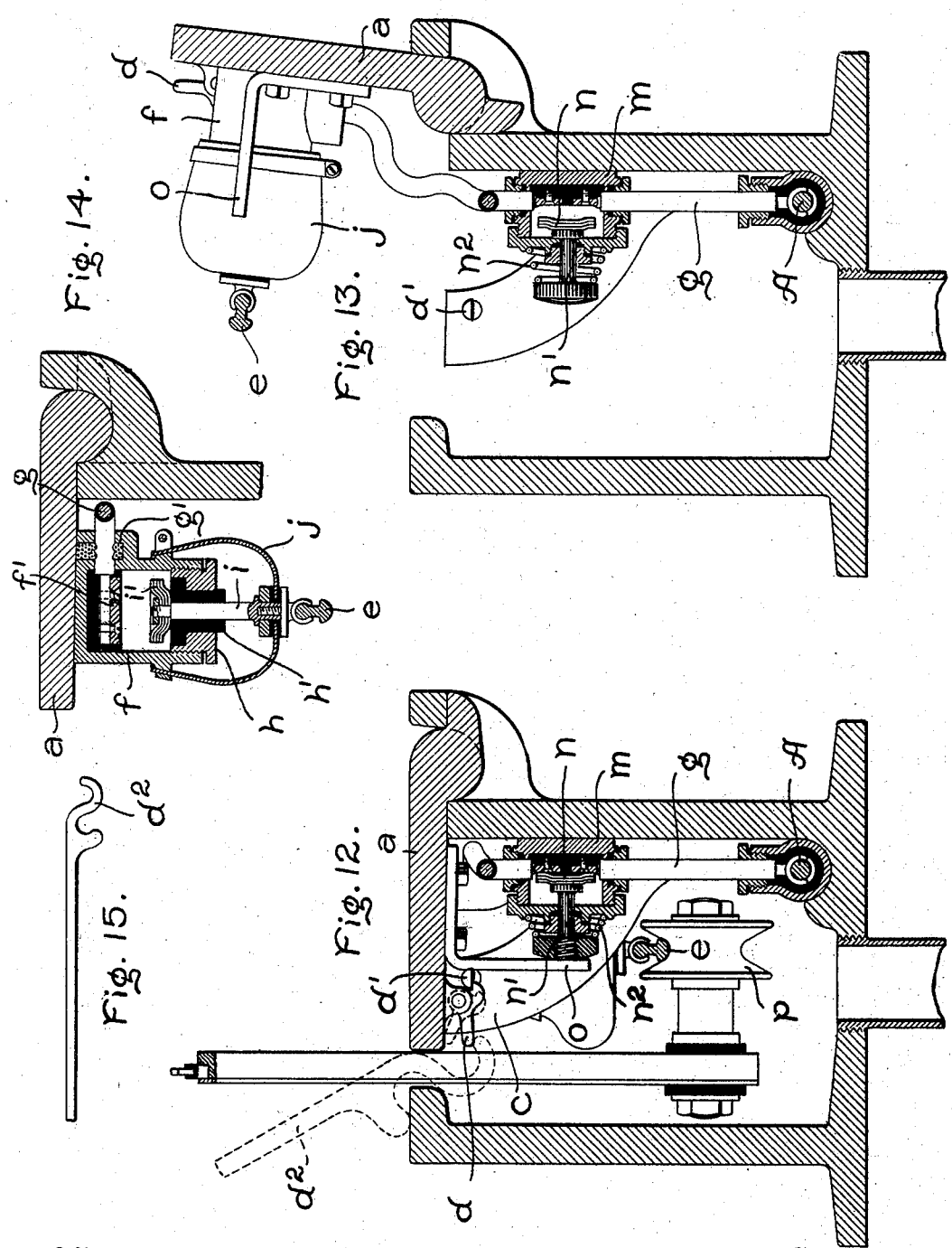

UNITED STATES PATENT OFFICE.

FRANK M. ASHLEY, OF NEW YORK, N. Y., ASSIGNOR TO THE GENERAL ELECTRIC COMPANY, OF NEW YORK.

CONDUIT ELECTRIC-RAILWAY SYSTEM.

SPECIFICATION forming part of Letters Patent No. 654,586, dated July 31, 1900.

Application filed February 26, 1898. Serial No. 671,796. (No model.)

*To all whom it may concern:*

Be it known that I, FRANK M. ASHLEY, a citizen of the United States, residing at New York, (Brooklyn,) county of Kings, State of New York, have invented certain new and useful Improvements in Conduit Electric-Railway Systems, of which the following is a specification.

This invention relates to conduit electric-railway systems, the object being to provide means for making the apparatus inside of the conduit easily and quickly accessible for the purpose of inspection and repairs.

The invention in general consists of a conduit provided with a removable cover-plate or top to which the main portions of the working mechanism inside of the conduit are attached.

The invention will be described with reference to the accompanying drawings, in which—

Figure 1 is a longitudinal section of my conduit. Fig. 2 is a perspective view of the conduit and its cover, the latter being detached. Figs. 3 and 4 are transverse sections of the conduit, showing the cover closed and open. Fig. 5 is a similar section of a modification in which no open slot is used. Figs. 6, 7, and 8 are respectively a section, side elevation, and detail of the conduit, illustrating a form of hinge for the cover. Figs. 9 and 10 are respectively a plan and detail of a modified form of hinge. Fig. 11 is a sectional view of the conduit wherein two hinged covers are used and showing how the conduit can be constructed of two angle-irons. Figs. 12 and 13 are sectional views of a conduit constructed in accordance with my invention and embodying an automatic breaker. Fig. 14 is a sectional detail of the working cut-out device between the sectional conductor and the main conductor, and Fig. 15 is a view of a hook for lifting the cover.

The construction of the conduit is of any of the usual types. The drawings illustrate it as cast or rolled in either one or two pieces and having a general rectangular shape. When made in two pieces, as illustrated in Figs. 6 and 11, the cost of production will probably be less than if made in one piece, as illustrated in the other figures; but the stability of the conduit is greater if made in one piece, and this form I prefer.

My invention relates more particularly to the cover or top of the conduit. This is represented in the drawings by $a$. It is to be easily detachable or lifted to expose the interior of the conduit by means of a peculiar construction of hinge. I will first describe the hinge illustrated in Figs. 2, 3, and 5. One of the upper corners of the conduit is provided with a continuous bar $b$, which is supported parallel to the conduit and a short distance therefrom by means of brackets or lugs $b'$. The bar and lugs are preferably cast integral with the side of the conduit. The cover $a$ has a rounded edge $a'$ and a series of lugs $a^2$. The edge $a'$ is adapted to rest upon the lugs $b'$ and to occupy the space between the bar $b$ and the edge of the conduit. The lugs $a^2$ are adapted to project into and fill the space between the lugs $b'$ and rest against the under side of the bar $b$ when the cover is closed. Several modifications of this hinge are shown. In Figs. 6, 7, and 8 the bar $b$ and lugs $b'$ are substituted by a continuous flange $b^2$, provided at intervals with perforations and with bolts $b^3$, projecting from a continuous rod $b^4$. The edge of the cover is semicylindrical, as shown at $a^3$, but is provided with notches $a^4$. When the parts are together, the rod $b^4$ rests in the hollow side of the semicylindrical edge $a^3$, with the bolts $b^3$ passing through the notches and through the flange $b^2$. On the under side of the flange the bolts are provided with nuts which hold them in place while permitting the cover to swing upon it as an axis. The construction shown in Figs. 9 and 10 is similar to that just described, except that the flange $b^2$ is notched instead of perforated and the bolts are provided with permanent heads.

Inside of the conduit are located brackets $c$ at suitable intervals, the upper ends of which support the free edge of the cover $a$. In Fig. 12 I have illustrated a form of latch $d$, which is attached to the cover and is adapted to engage with a lug $d'$ on a bracket $c$. When the cover is to be lifted, the latch may be released by inserting a hook $d^2$, Fig. 15, through the slot of the conduit.

The main supply-conductor is indicated by

A. It is thoroughly insulated and deposited in a groove along the bottom of the conduit. Each of the cover-plates $a$ is adapted to support a section of the sectional conductor $e$. Each plate has attached to its under side one or more inverted cups $f$, in the bottom of which is suitably fixed and insulated a contact-piece $f'$. This is in electrical connection with the main conductor A by means of a branch wire $g$, leading through a suitable stuffing-box $g'$. The lower end of the cup is closed by a screw-plug $h$, provided with a non-conducting bushing $h'$, through which passes a reciprocating rod $i$. The inner end of this rod carries a contact-piece $i'$, adapted to connect with $f'$. The outer end of the rod passes through a flexible bulb $j$, to which it is secured, and is provided with a suitable clamp which is attached to a section of the conductor $e$. The flexible bulb $j$ may be of metal, leather, rubber, or other suitable material which will permit the contact $i'$ to make connection with contact $f'$. It is to be adjusted to the inverted cup $f$ in such a manner as to be substantially air and water tight. This construction provides for the thorough protection and insulation of the contact-piece $f'$. I preferably attach two of these insulators to each cover, locating them near the extremities thereof, and as the section $e$ is of the same length as the plate the swing of the plate upward upon the hinge will carry the insulators and the section out of the conduit and into position for easy inspection and repair. When the cover is thus lifted, it is desirable that the electrical connection with the main conductor A shall be broken in order that no escape of current or shocks may be sustained. For this purpose I have provided a cut-out box $m$, through which the conductor $g$ passes and in which a break in its circuit is made. This break is normally bridged by a contact-piece $n$, fixed to the end of a plunger $n'$, which is subject to the pressure of a spring $n^2$, tending to open the circuit of wire $g$. When the cover is down, a finger $o$ holds the plunger $n'$ inward and maintains the circuit through $g$ complete; but when the cover is lifted the finger $o$ leaves the head of the plunger, which then moves outward under the action of the spring and breaks the circuit. So long, therefore, as the cover is open no current can reach the parts attached to it.

The contact device carried by the car is an under contact-trolley $p$, which runs in connection with the sectional conductor $e$ and lifts its sections to close the circuit at $f'$ as it moves along.

The construction of my hinged cover is of course applicable to any conduit system.

Having thus described my invention, I claim—

1. In an electric-railway system, the combination with a conduit, of a hinged cover therefor, sectional working conductors in said conduit, and means for establishing electrical connection between said conductors and the motor of the car when said cover is in its normal position over the conduit.

2. In an electric railway, the combination of a conduit, a hinged cover therefor, and a sectional working conductor carried by said cover, substantially as described.

3. In an electric railway, the combination of a conduit, a hinged cover therefor, a sectional working conductor supported by the cover, and a cut-out for said conductor.

4. In an electric railway, the combination of a conduit, a cover hinged thereto, a sectional working conductor attached to said cover, and a cut-out for said conductor which is automatically operated when the cover is swung on its hinge.

5. In an electric-railway system, the combination with a conduit, of a removable cover therefor, contact devices carried by said cover and operative only when the cover is in its closing position.

6. In an electric railway, the combination of a sectional conductor, a support therefor consisting of a cup provided with contact-points one of which is movable, and a flexible bulb surrounding one end of the cup, to which the movable contact-piece and the sectional conductor are attached substantially as described.

7. In an electric-railway system, the combination of a conduit, a movable cover therefor, a main conductor, a sectional conductor, the sections of said conductor being carried by said cover, a branch wire between the two conductors, a cut-out in said branch wire and means connected with the cover for operating said cut-out, substantially as described.

8. In an electric-railway system, the combination with a conduit, of a movable cover therefor, sectional working conductors supported by said cover and adapted to reciprocate independently thereof.

9. The combination with a conduit, of a movable cover therefor, contact devices carried by said cover and operative only when the cover is in the closing position, sectional working conductors carried by the said cover and adapted to have movement independent thereof to be connected with said contact devices.

10. The combination with a conduit, of a movable cover therefor, contacts carried by said cover and operative only when said cover is in its closing position, reciprocative working conductor-sections carried by said cover, a contact device carried by a car and adapted to engage with the said working sections and cause them to become electrically connected with said contacts.

11. The combination with a conduit, of a movable cover therefor, contacts supported by said cover, a line conductor connected with said contacts, and means for breaking said connection when the cover is moved.

12. The combination with a conduit, of a movable cover therefor, contacts carried by said cover, line conductors connected with said contacts, cut-outs in said connections, and means carried by said cover adapted to open said cut-outs when the cover is raised.

13. The combination with a conduit, of a movable cover therefor, a line conductor, contacts adapted to be connected therewith, a switch-piece normally pressed away from the terminals of said contacts and conductor, and a finger carried by said cover adapted to press said switch-piece against said terminals when the cover is in its closing position.

In witness whereof I have hereunto set my hand this 13th day of November, 1897.

FRANK M. ASHLEY.

Witnesses:
WM. A. ROSENBAUM,
HARRY BAILEY.